US012319061B2

(12) United States Patent
Woo et al.

(10) Patent No.: US 12,319,061 B2
(45) Date of Patent: Jun. 3, 2025

(54) PRINTING APPARATUS AND PROVIDING METHOD THEREOF

(71) Applicant: SEMES CO., LTD., Chungcheongnam-do (KR)

(72) Inventors: Jang Mi Woo, Chungcheongnam-do (KR); Ki Hoon Choi, Gyeonggi-do (KR); Young Hoon Jeong, Chungcheongnam-do (KR); Myung Jin Kim, Chungcheongnam-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 156 days.

(21) Appl. No.: 17/961,460

(22) Filed: Oct. 6, 2022

(65) Prior Publication Data

US 2023/0115826 A1 Apr. 13, 2023

(30) Foreign Application Priority Data

Oct. 8, 2021 (KR) ........................ 10-2021-0133943

(51) Int. Cl.
*B41J 2/14* (2006.01)

(52) U.S. Cl.
CPC .... *B41J 2/1433* (2013.01); *B41J 2002/14362* (2013.01); *B41J 2002/14411* (2013.01)

(58) Field of Classification Search
CPC ........ B41J 2/1433; B41J 2/14; B41J 2/14024; B41J 2002/14362; B41J 2002/14411
See application file for complete search history.

(56) References Cited

U.S. PATENT DOCUMENTS

2007/0165070 A1* 7/2007 Honma ................ B41J 2/14233
347/47

FOREIGN PATENT DOCUMENTS

| | | |
|---|---|---|
| JP | 2007-276426 | 10/2007 |
| KR | 10-2008-0011925 | 2/2008 |
| KR | 10-2014-0020663 | 2/2014 |
| KR | 10-2020-0045099 | 5/2020 |
| KR | 10-2020-0049111 | 5/2020 |

OTHER PUBLICATIONS

Office Action dated Jun. 22, 2023 for Korean Patent Application No. 10-2021-0133943 and its English translation from Global Dossier.

* cited by examiner

*Primary Examiner* — Jason S Uhlenhake
(74) *Attorney, Agent, or Firm* — WOMBLE BOND DICKINSON (US) LLP

(57) ABSTRACT

A printing apparatus and a method of providing printing apparatus are provided. A printing apparatus according to at least one embodiment of the present disclosure includes a base panel or head base, at least one or more head packs installed on the head base, a head pack holder installed on each of the head packs and configured to handle and fix the head pack, and a fastening structure configured to mount the head pack holder to the head packs.

17 Claims, 18 Drawing Sheets

[Fig. 1]
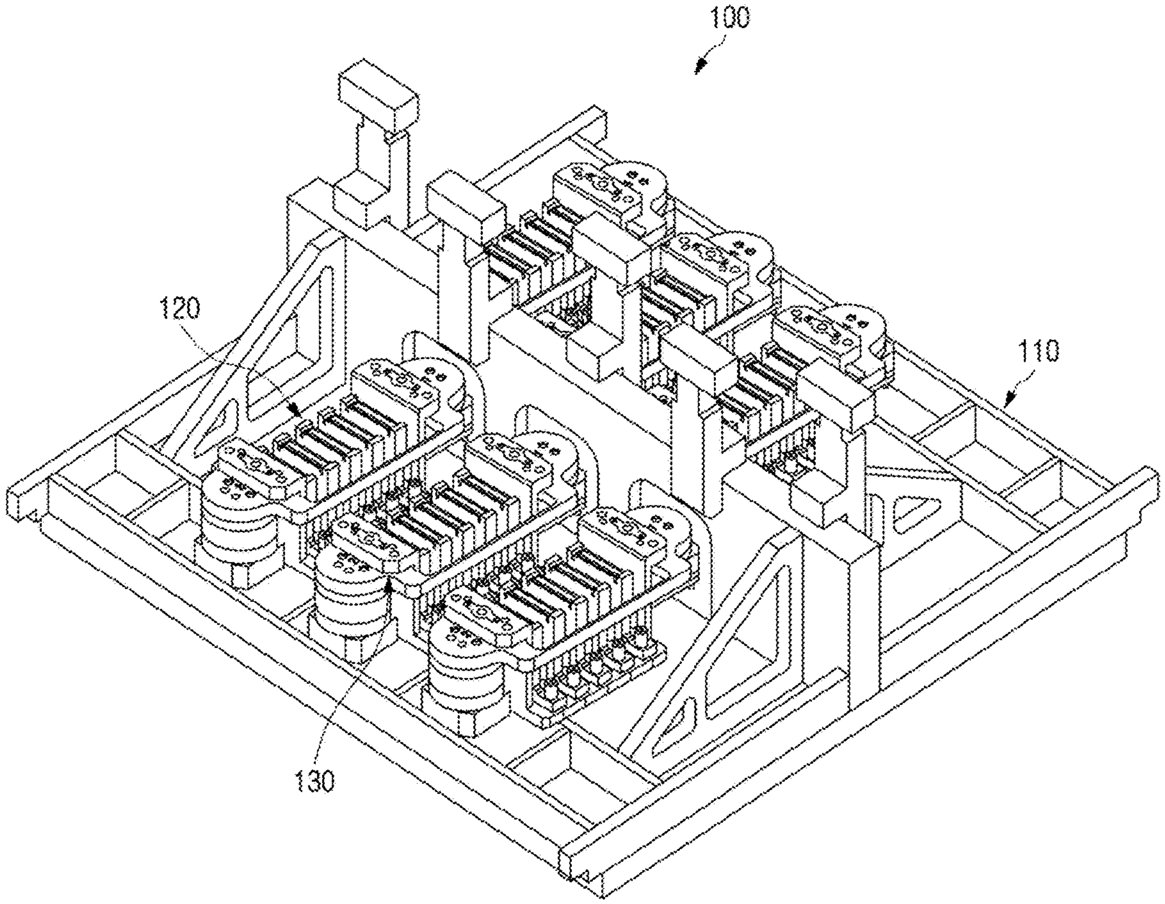

[Fig. 2]
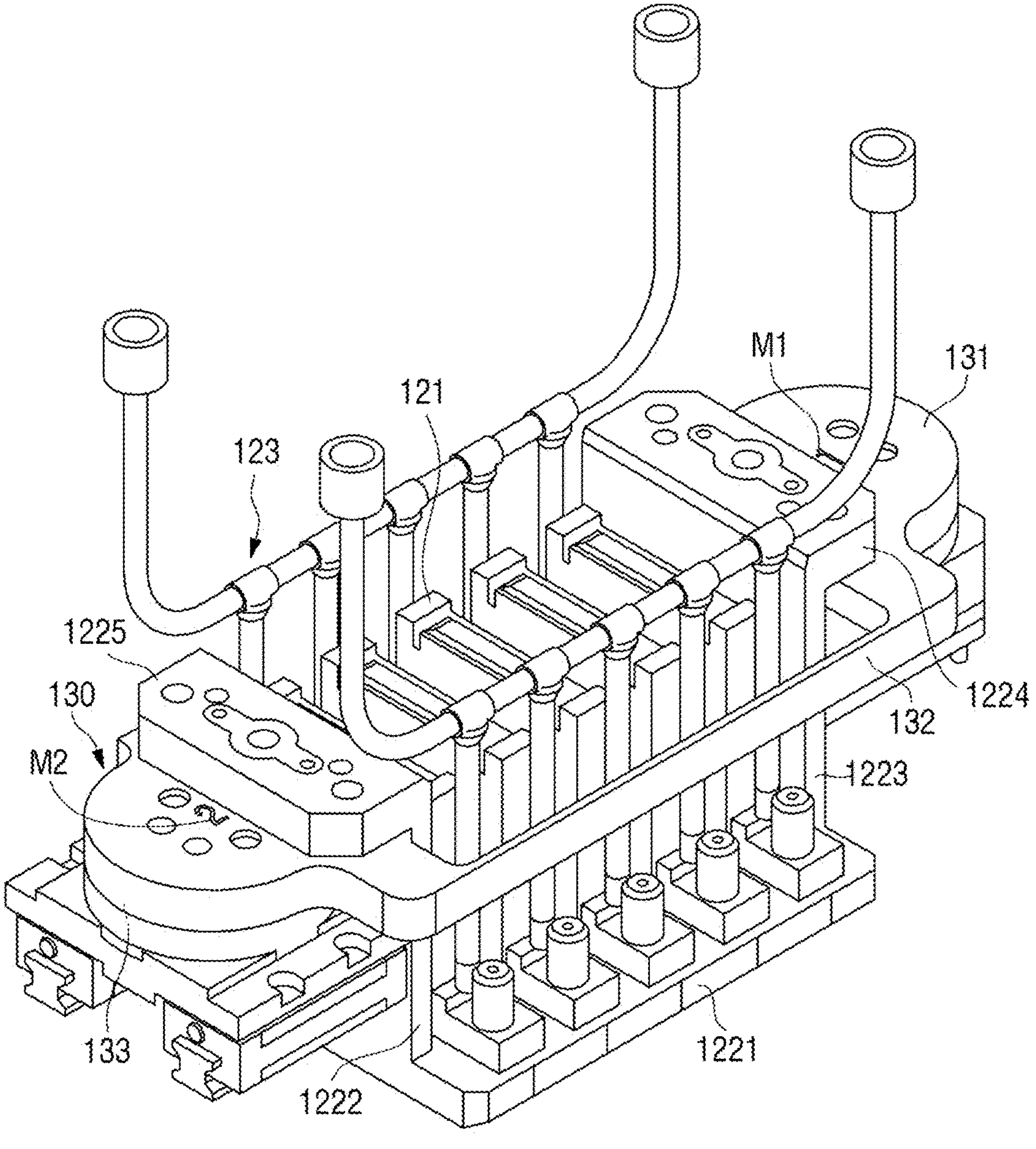

[Fig. 3]
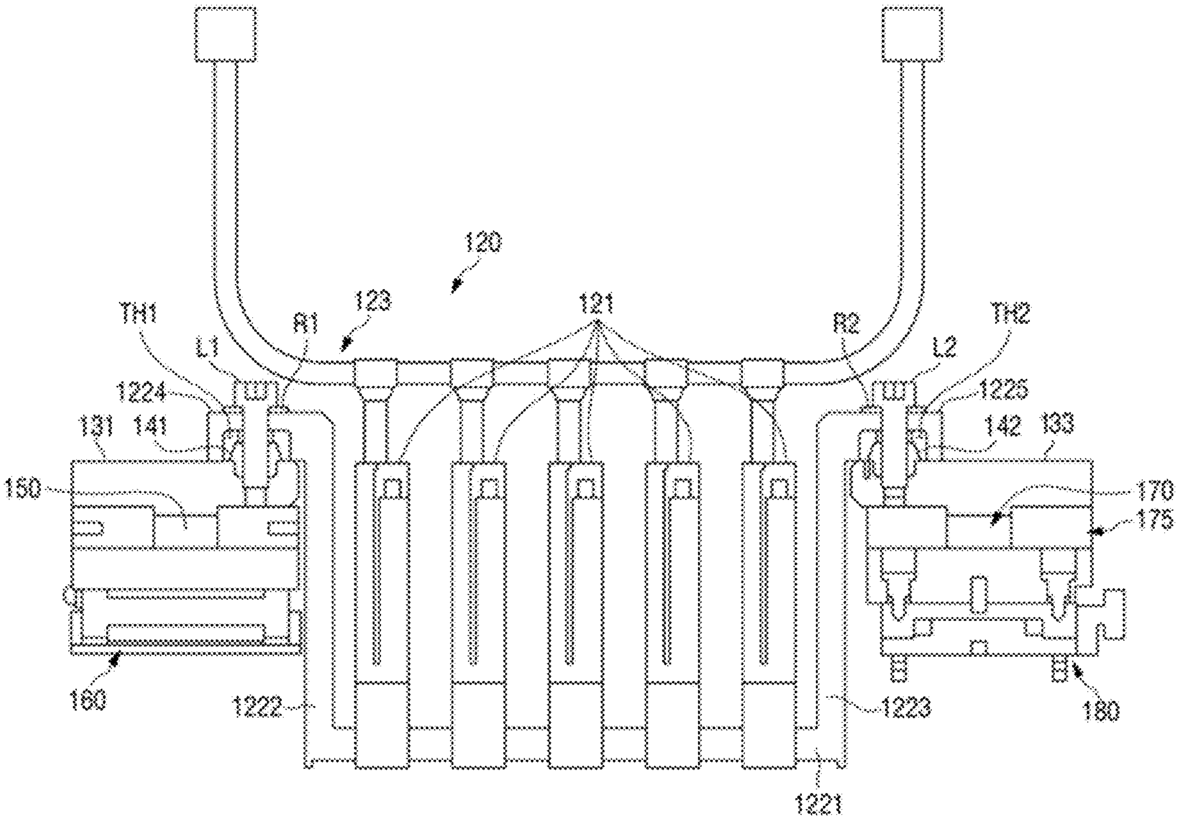

[Fig. 4]
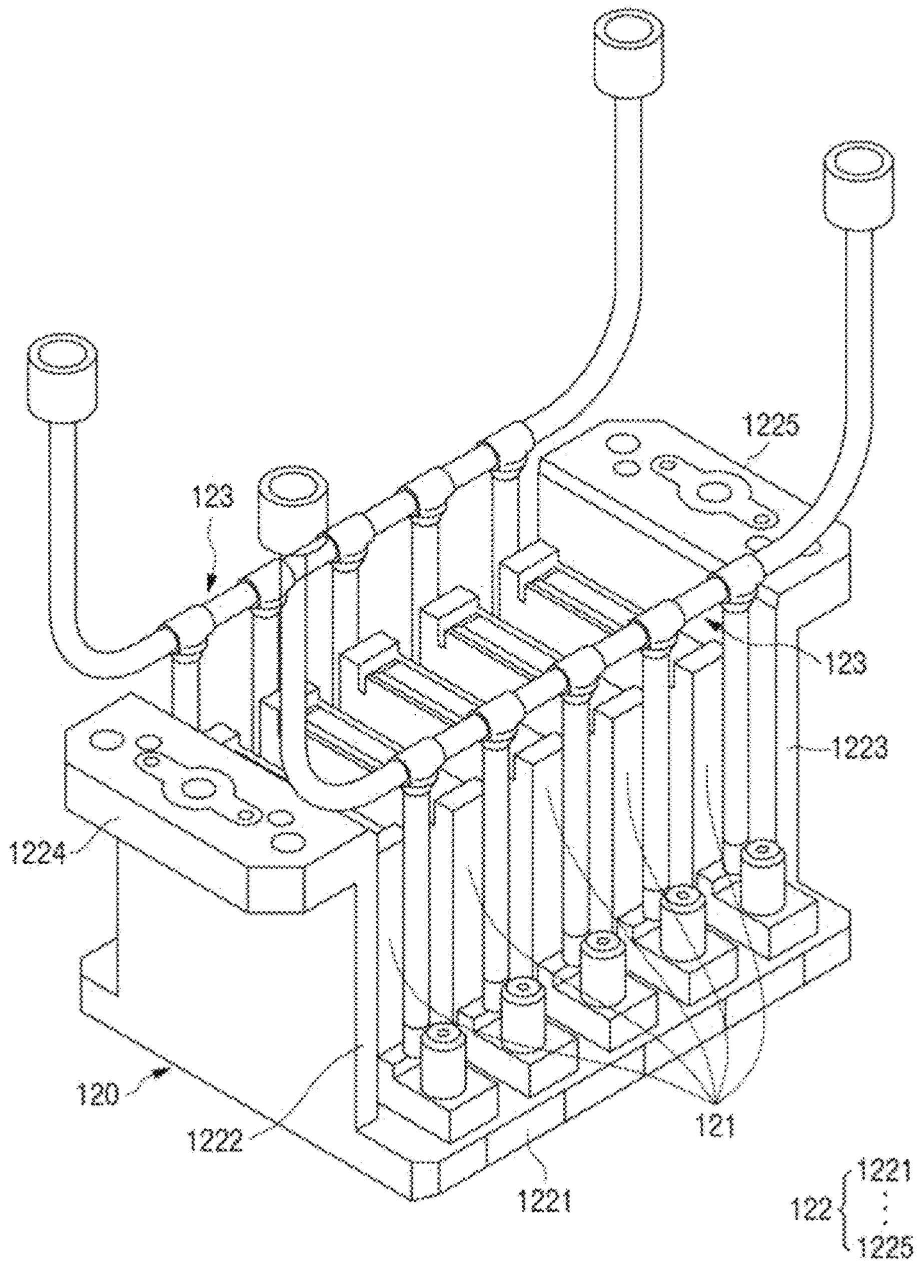

[Fig. 5]
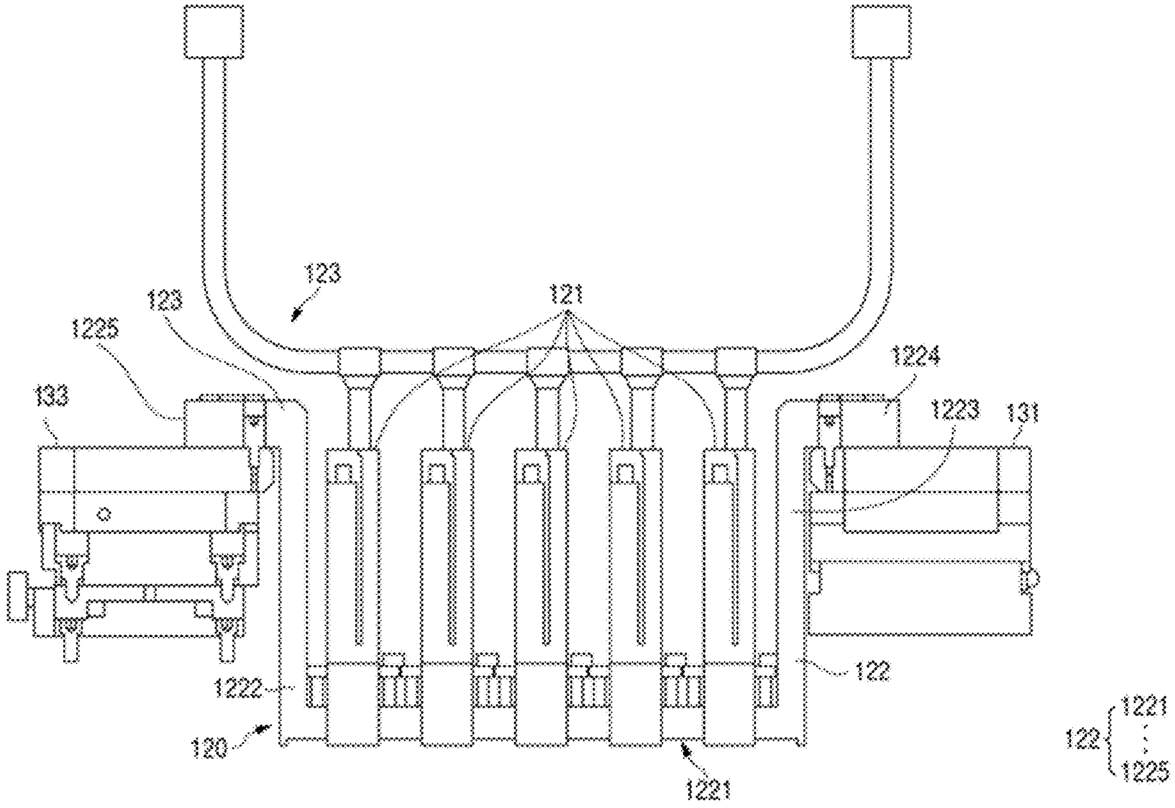

[Fig. 6]
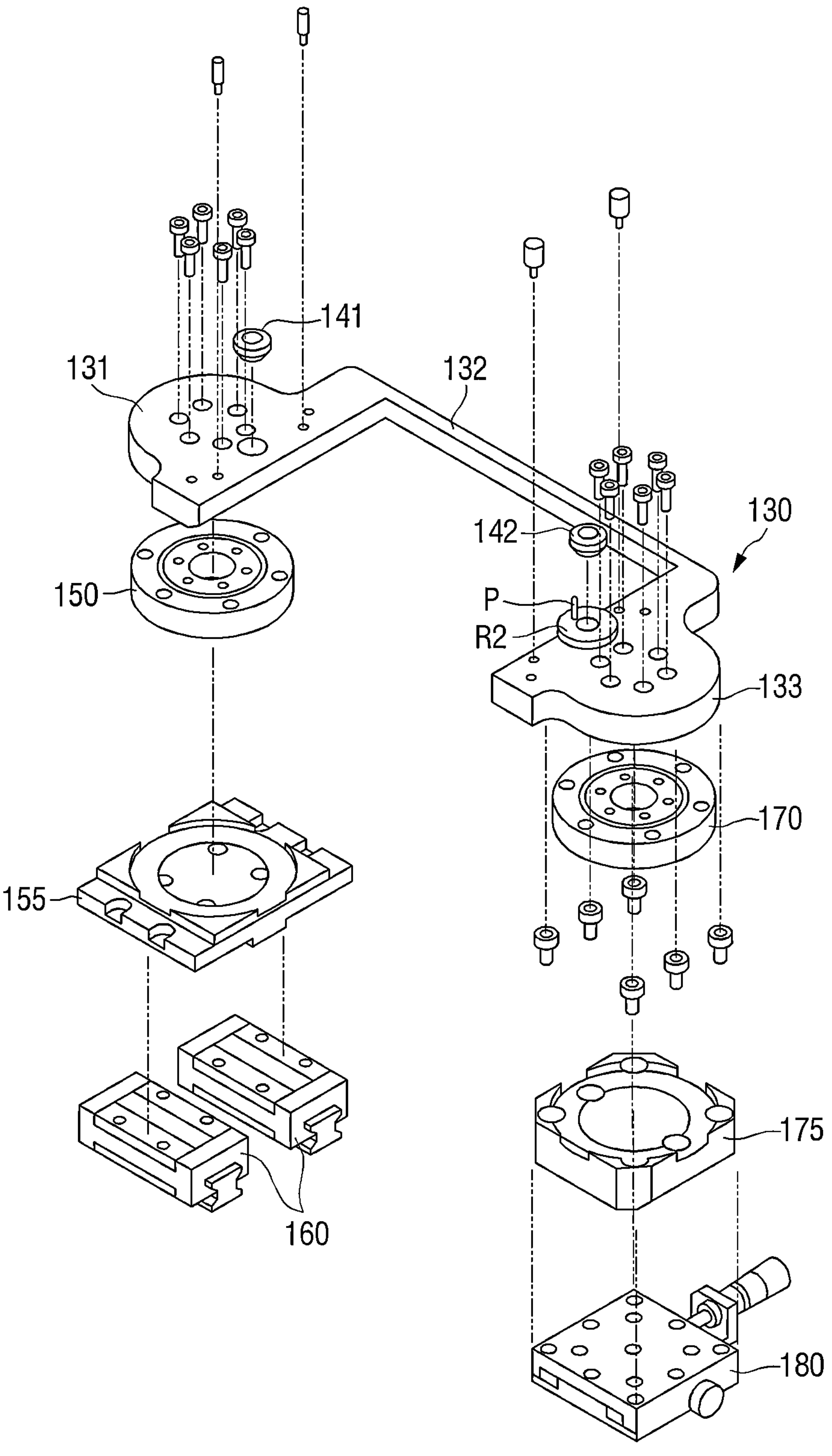

[Fig.7]
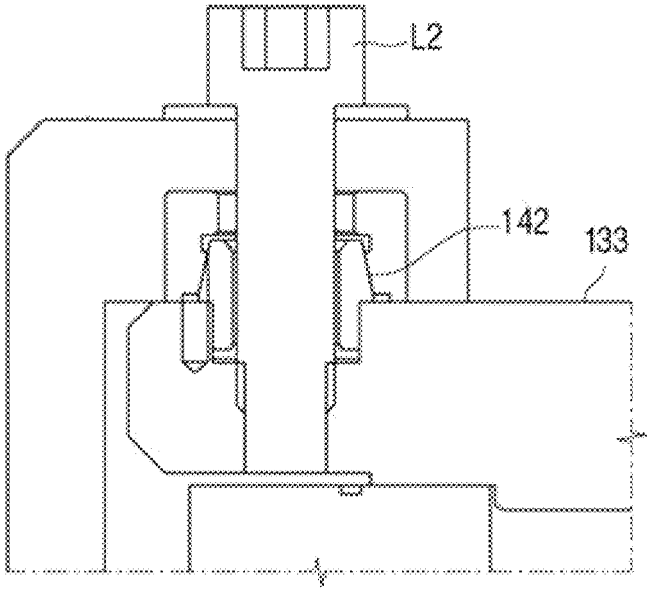

[Fig. 8]
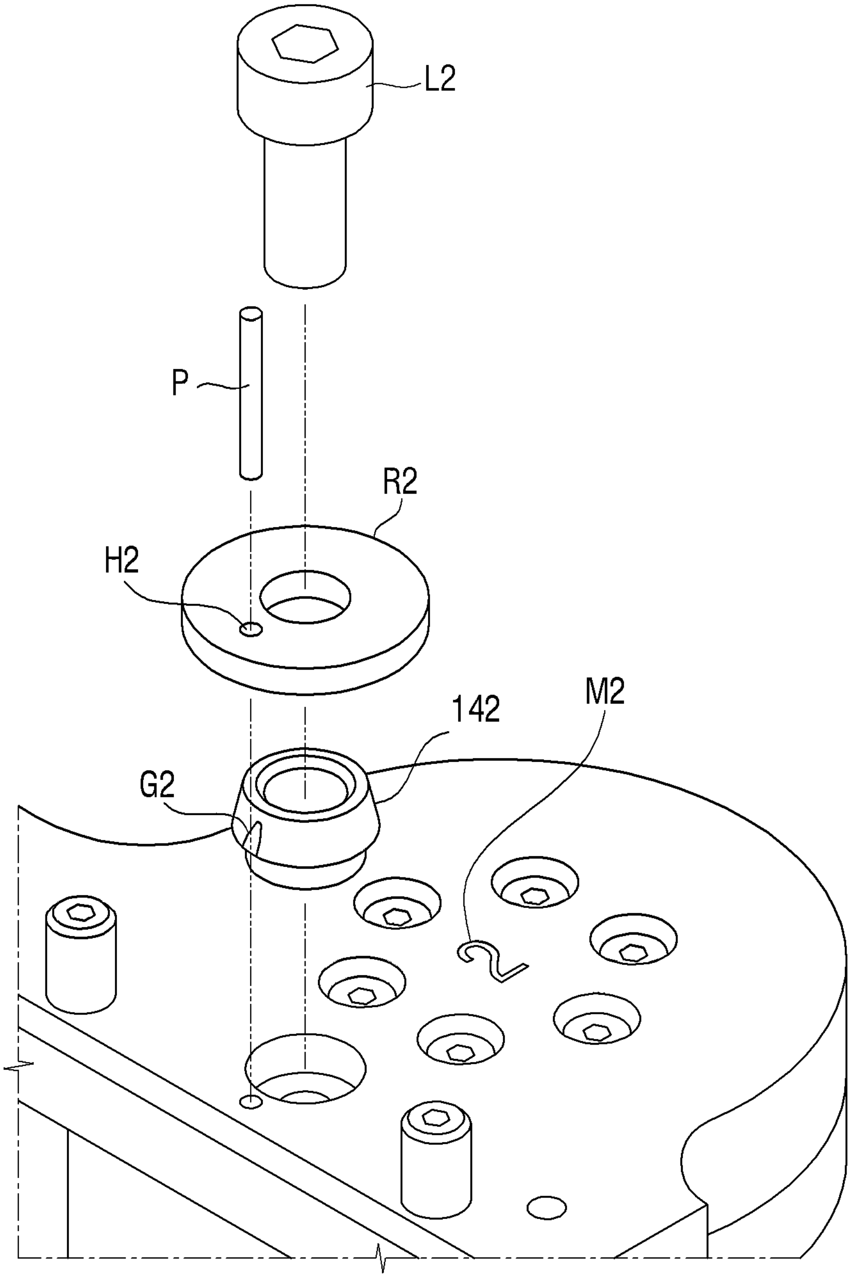

[Fig. 9]
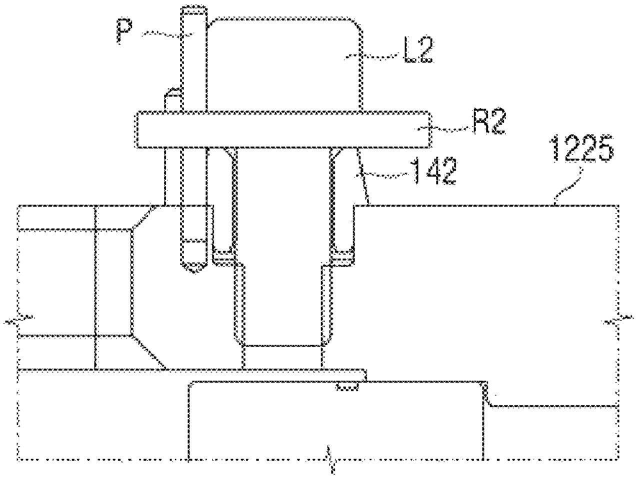

[Fig.10]
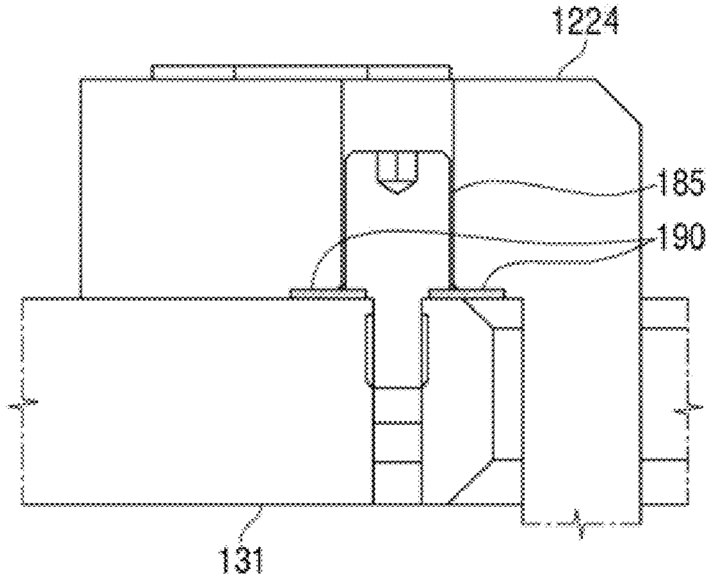

[Fig. 11]
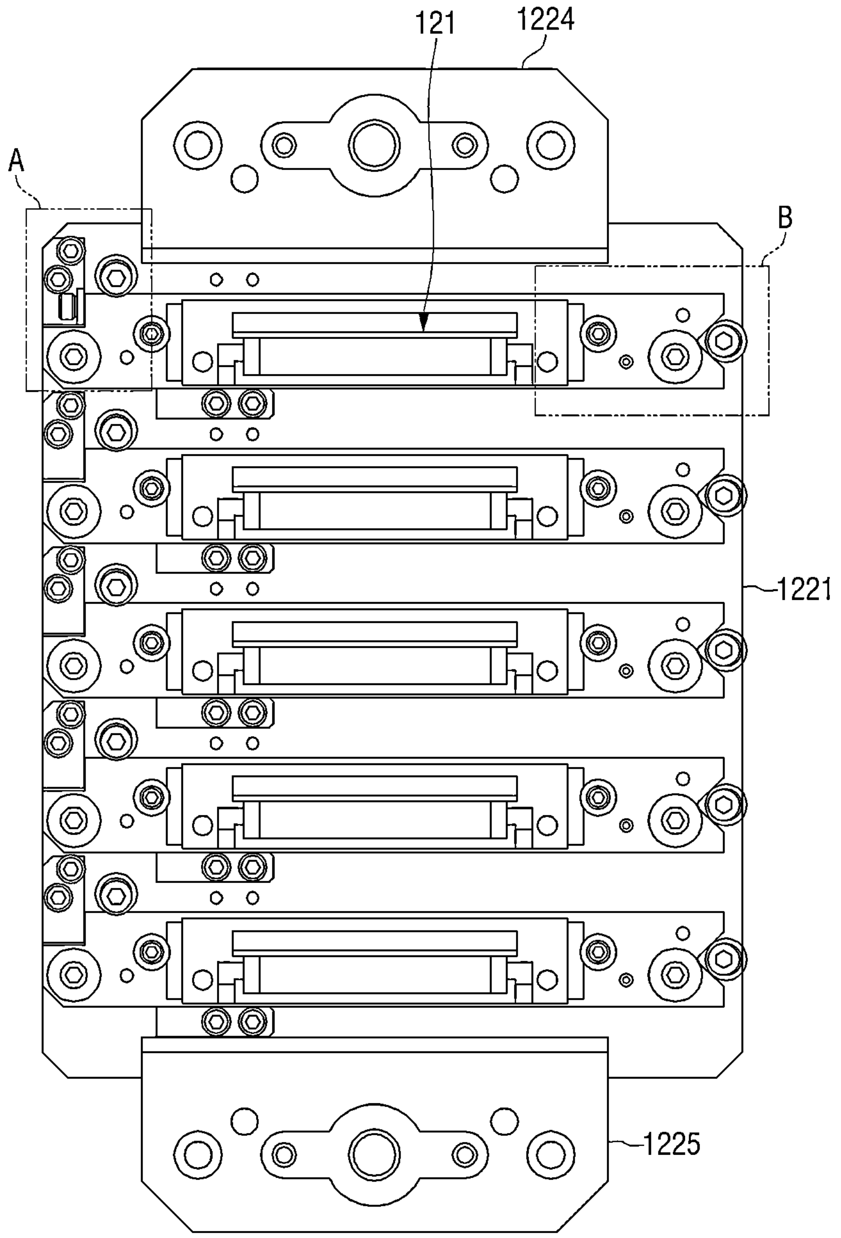

[Fig. 12]
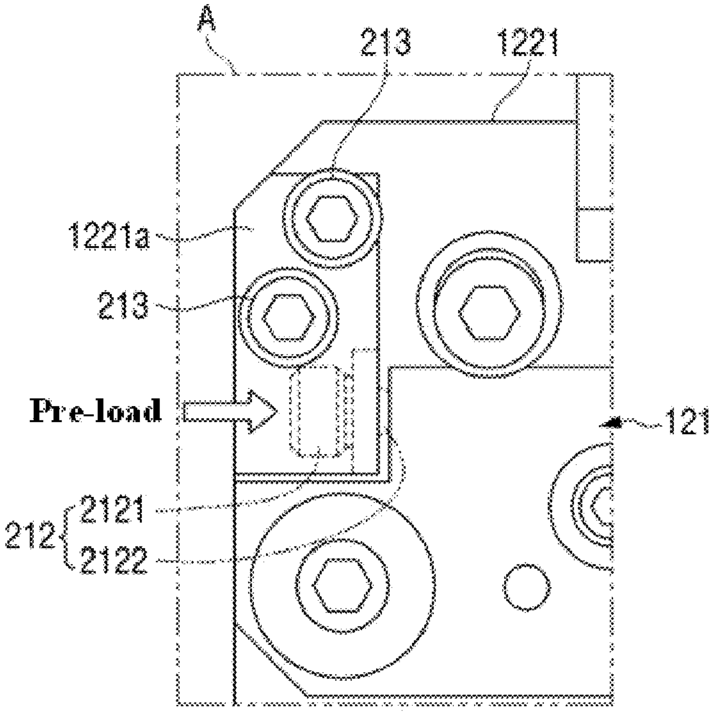

[Fig. 13]
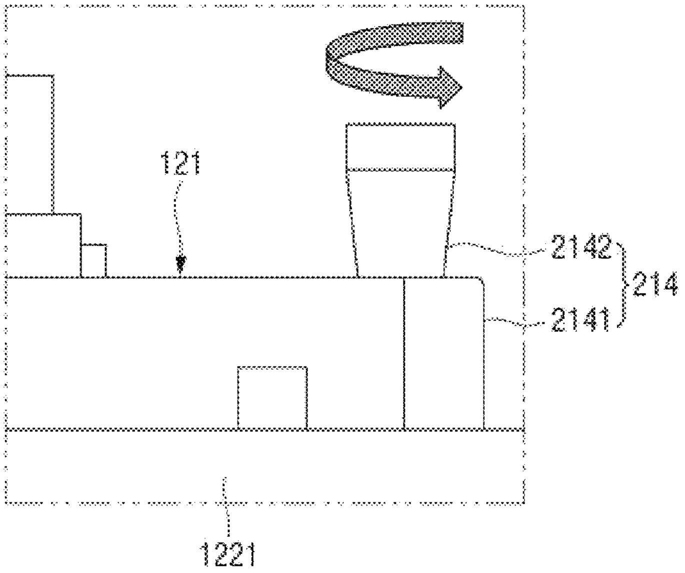
[Fig. 14]
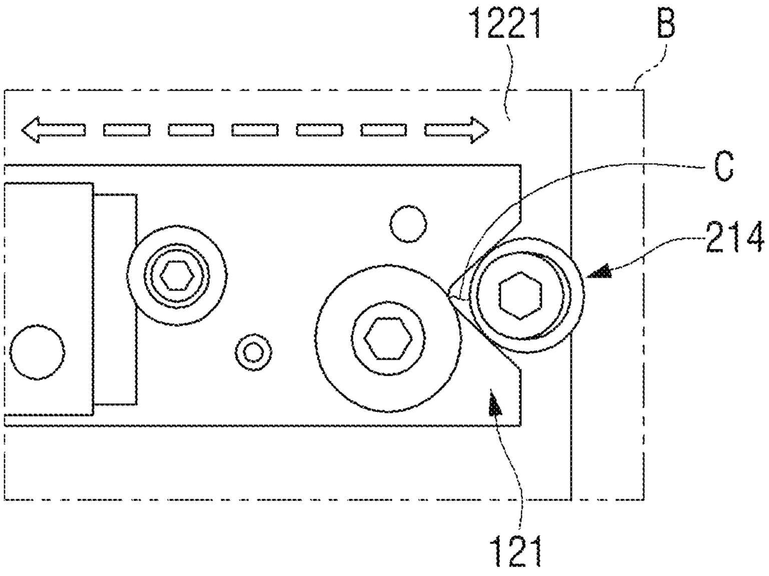

[Fig. 15]
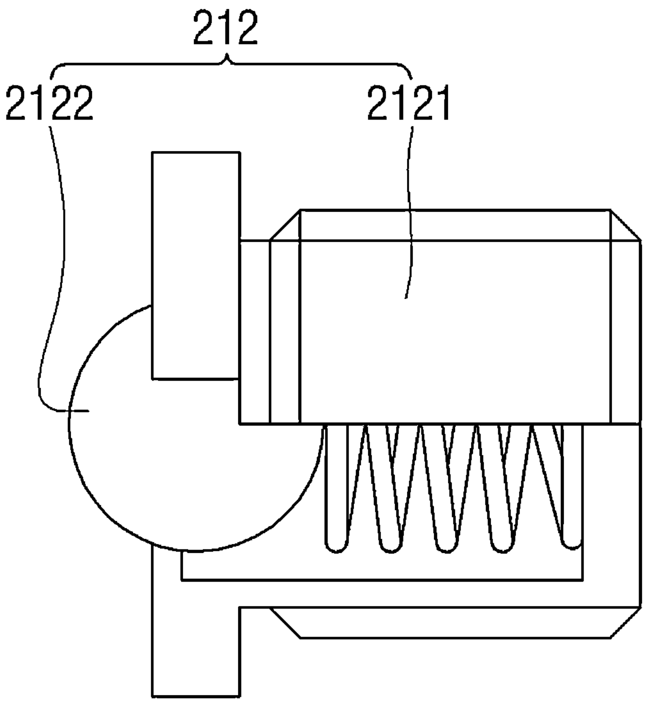

[Fig. 16]
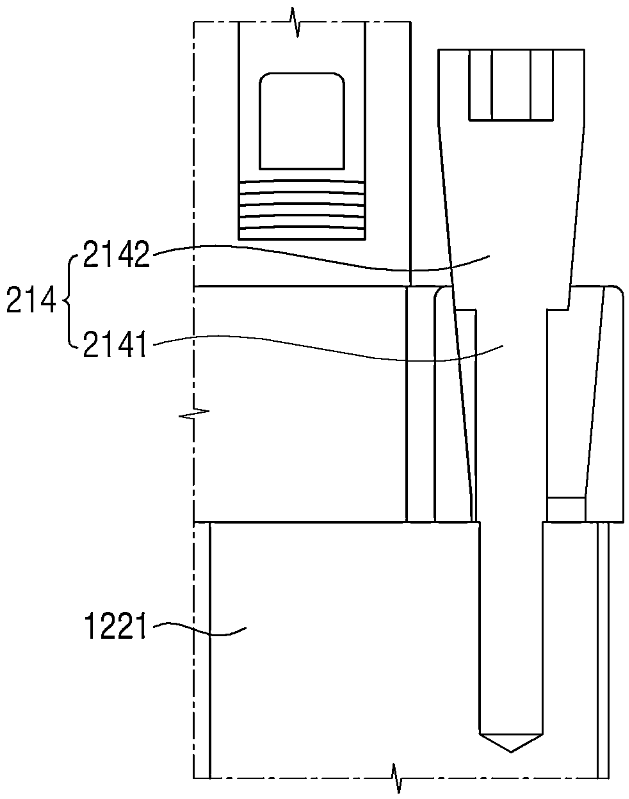

[Fig. 17]
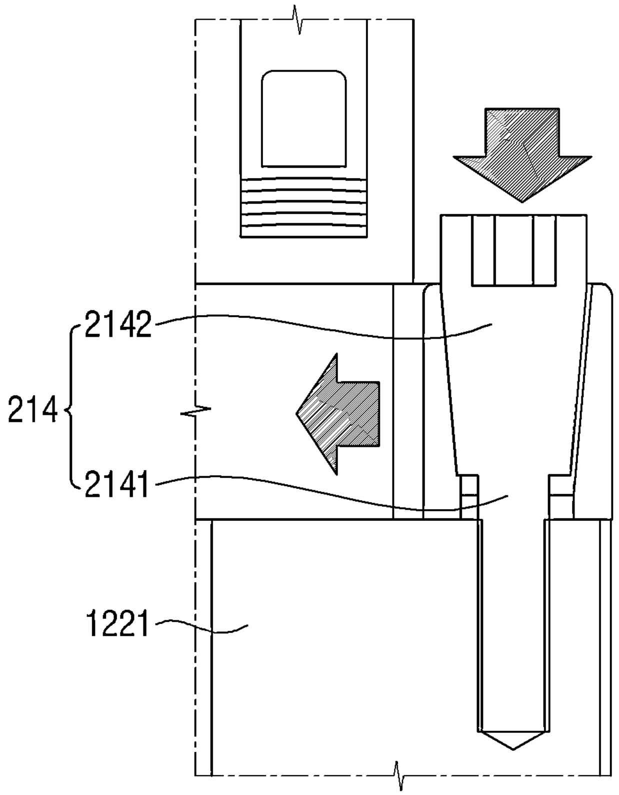

[Fig. 18]
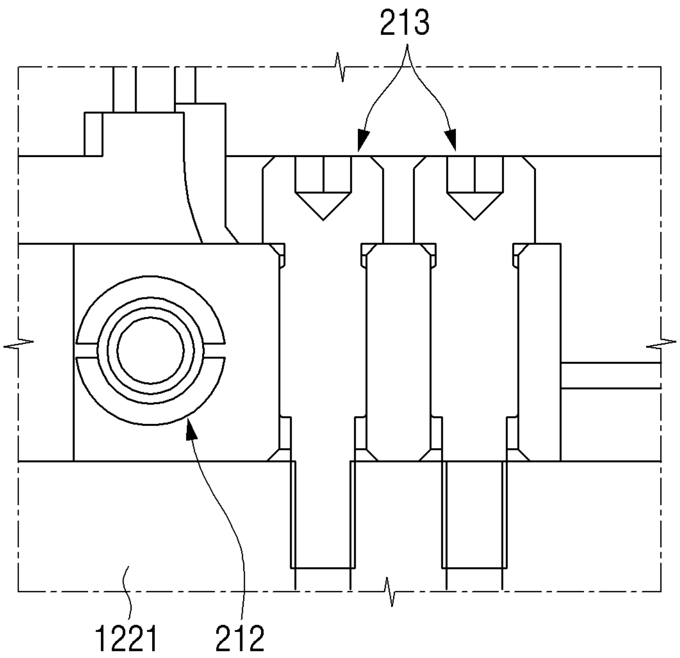

[Fig. 19]
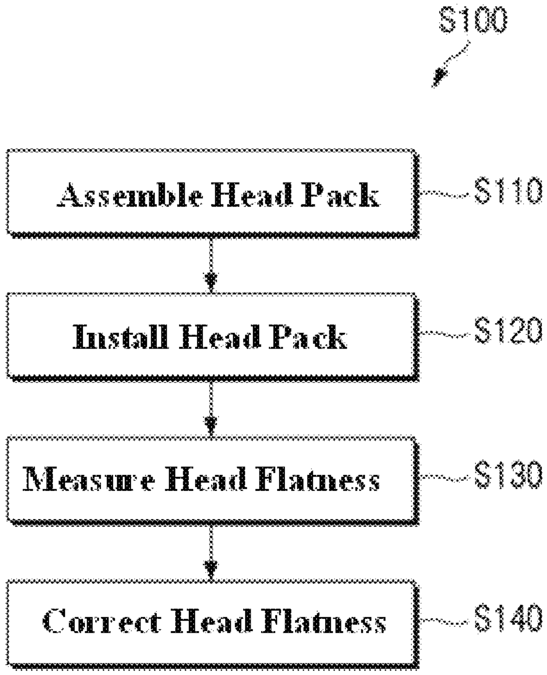

PRINTING APPARATUS AND PROVIDING METHOD THEREOF

CROSS-REFERENCE TO RELATED APPLICATION

This application claims priority from Korean Patent Application No. 10-2021-0133943 filed on Oct. 8, 2021 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a printing apparatus and a method of providing thereof.

2. Description of the Related Art

In a printing apparatus for substrate processing, ink ejection heads are assembled in a pack and the subassembly of the head pack is assembled with a head base or base panel, wherein clearances during assembly are susceptible to occur. Such clearances affect the accuracy of the printing apparatus when printing. Orderly and appropriate processes of assembly need to be carried out as planned through alignment, fastening, etc. of the components responsible for printing. This is required for preventing possible deviation of the set tolerance between different components and to prevent the negative influence on inkjet jetting from occurring.

PRIOR ART LITERATURE

Patent Documents (Patent document 1) Korean Patent Application Publication No. 10-2008-0011925

SUMMARY

Aspects of the present disclosure provide a printing apparatus assembled in an effective way to reduce clearances between different components thereof to achieve narrow tolerance for error.

Another aspect of the present disclosure provides a printing apparatus capable of improving the printing quality by increasing the ink injection accuracy of the printing apparatus with narrow tolerance for error through the reduction of the clearances in the printing apparatus.

Yet another aspect of the present disclosure provides a printing apparatus capable of improving the printing quality by increasing the ink injection accuracy of the printing apparatus through the measurement of the flatness of such component portions of the printing apparatus that are responsible for mounting the heads of the printing apparatus and through effective correction of the flatness.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a printing apparatus including a base panel or head base, at least one or more head packs installed on the head base, a head pack holder installed on each of the head packs and configured to handle and fix the head pack, and a fastening structure configured to mount the head pack holder to the head packs.

The fastening structure may include a datum pin provided in the head pack holder and configured to fasten the head pack holder to the head pack, and a cut pin provided in the head pack holder and configured to fasten the head pack holder to the head pack after the datum pin fastens the head pack holder.

The datum pin and the cut pin may be fastened with a torque ranging from 120 to 130 kgf·cm through a torque wrench.

The datum pin and the cut pin may be respectively fastened to the head pack holder based on identifiable states that are mutually distinguishable.

The identifiable states may include a first identifiable state established by providing the head pack holder with a first marking position indicated by a first marking for allowing mounting of the datum pin to the head pack holder, and providing the head pack holder with a second marking position indicated by a second marking which is different from the first marking, for allowing mounting of the cut pin to the head pack holder.

The identifiable states may also include a second identifiable state configured to allow distinctive mountings of the datum pin and the cut pin to the head pack holder, and established by providing the head pack holder with only one of the first marking and the second marking.

The identifiable states may each include a second identifiable state configured to allow distinctive mountings of the datum pin and the cut pin to the head pack holder, and established by providing the head pack holder with only one of the first marking and the second marking.

The head pack may include a plurality of heads, a head pack base on which the heads are installed, and a piping module installed on the heads and the head pack base and configured to dispatch a chemical solution.

The head pack base may include a mounting plate for the heads to be installed, a first elongated body extending upwardly of one side of the mounting plate, a second elongated body extending upwardly of the other side of the mounting plate, a first flange extending outwardly of the first elongated body, and a second flange extending outwardly of the second elongated body, and the head pack holder may be installed via the first flange and the second flange.

The head pack holder may include a first fastening body on one side and a second fastening body provided on the other side to face the first fastening body through a bridge portion, and the first fastening body may be installed on a lower surface of the first flange, and the second fastening body is installed on a lower surface of the second flange.

According to another aspect of the present disclosure, there is provided a printing apparatus including a base panel or head base, at least one or more head packs installed on the head base, a head pack holder installed on each of the head packs and configured to handle and fix the head pack, and a fastening structure configured to mount the head pack holder to the head packs. Here, the fastening structure includes a datum pin provided in the head pack holder and configured to fasten the head pack holder to the head pack, and a cut pin provided in the head pack holder and configured to fasten the head pack holder to the head pack after the datum pin fastens the head pack holder. The datum pin and the cut pin are respectively fastened to the head pack holder based on identifiable states that are mutually distinguishable. The identifiable states include a first identifiable state and a second identifiable state. The first identifiable state is established by providing the head pack holder with a first marking position indicated by a first marking for allowing mounting of the datum pin to the head pack holder, and providing the head pack holder with a second marking position indicated by a second marking, which is different from the first marking, for allowing mounting of the cut pin to the head pack holder. The second identifiable state is configured to allow distinctive mountings of the datum pin and the cut pin to the head pack holder and established by providing the head pack holder with only one of the first marking and the second marking. The head pack includes a plurality of heads, a head pack base on which the heads are installed, and a piping module installed on the heads and the head pack base and configured to dispatch a chemical solution. The head pack base includes a mounting plate for the heads to be installed, a first elongated body extending upwardly of one side of the mounting plate, a second elongated body extending upwardly of the other side of the mounting plate, a first flange extending outwardly of the first elongated body, and a second flange extending outwardly of the second elongated body. The head pack holder includes a first fastening body on one side and a second fastening body provided on the other side to face the first fastening body through a bridge portion. The first fastening body is installed on a lower surface of the first flange, and the second fastening body is installed on a lower surface of the second flange. The head pack holder is installed via the first flange and the second flange. The datum pin and the cut pin are fastened with a torque ranging from 120 to 130 kgf·cm through a torque wrench.

The printing apparatus may further include a first theta-axis rotating unit installed under the first fastening body and configured to perform a rotational operation in a theta axis direction, a first manual stage unit of a block type installed under the first theta-axis rotating unit and configured to transfer the rotational operation in the theta axis direction to attachments to the first manual stage unit, and at least one or more linear motion guide units installed under the first manual stage unit and configured to provide a moving force in a Y-axis direction in response to the rotational operation in the theta axis direction.

The printing apparatus may further include a second theta-axis rotating unit installed under the second fastening body and configured to perform the rotational operation in the theta axis direction, a second manual stage unit of a block type installed under the second theta-axis rotating unit and configured to transfer the rotational operation in the theta axis direction to attachments to the second manual stage unit, and a third manual stage unit installed under the second manual stage unit and configured to provide a moving force in the theta axis direction through a manipulation means.

The datum pin may be installed on top of the first fastening body and inserted into a first insertion groove formed in the first flange, and the cut pin may be installed on top of the second fastening body and inserted into a second insertion groove formed in the second flange.

The datum pin and the cut pin may be formed to taper upward, and the first insertion groove and the second insertion groove may be made to conform to the datum pin and the cut pin, respectively.

The first flange may be provided with a first fastener for fixing the datum pin to be variable in position within a predetermined range in the first insertion groove. The second flange may be provided with a second fastener for fixing the cut pin to be variable in position within a predetermined range in the second insertion groove. The first fastener may be inserted from above the first flange into secure engagement with the datum pin on the first fastening body. The first fastener and the first flange may be provided with a first contact ring interposed as a coupling reinforcement between the first fastener and the first flange. The second fastener may be inserted from above the second flange into secure engagement with the cut pin on the second fastening body. The second fastener and the second flange may be provided with a second contact ring interposed as a coupling reinforcement between the second fastener and the second flange.

The guide ring may be formed with a through hole from top to bottom of the second contact ring. The cut pin may be formed with a groove extending in a height direction along a portion of the circumference of the cut pin. The guide ring may be aligned at a predetermined position corresponding to the cut pin by using a link pin that enters the groove of the cut pin through the through hole of the guide ring. The second fastener may be installed to be in position and alignment with the second flange and the second fastening body through the guide ring.

The head pack holder may have a correction structure configured to correct the flatness of an understructure of the head on the head pack. The correction structure may include mounting pins mounted respectively on the head pack holder at set positions for the first fastening body and the second fastening body and compensating rings disposed at the set positions to be inserted over the mounting pins and compressively fixed to the first fastening body and the second fastening body of the head pack holder based on a forward or reverse rotation of the mounting pins.

The compensating rings may each have a compensating thickness corresponding to a correction value needed for correcting the flatness of the understructure of the head.

According to yet another aspect of the present disclosure, there is provided a method of providing a printing apparatus, including assembling at least a portion of a head pack, installing the head pack on a base panel or head base, measuring the flatness of the head pack at a bottom surface configured to discharge a chemical solution, and correcting a flatness of the head pack based on a measured flatness of the bottom surface of the head pack.

The head pack may include at least one or more heads for discharging the chemical solution and a head pack base for mounting the heads. The head pack base may include a mounting plate that is installed with the heads, and elongated bodies extending upwardly from the mounting plate.

Additionally, the mounting plate may have a bottom portion provided with a handling module for fixing the understructure of the heads. The handling module may be provided with a fixing block mounted on the bottom portion of the mounting plate, a fixing structure configured to fix the fixing block to the mounting plate, and at least one or more preload modules each placed in the mounting plate and configured to preload the side of the head in a forward rotation or reverse rotation method. The preload modules may be respectively installed in the mounting plate at a first position in any one of the vertical directions of the head and a second position in any one of both longitudinal directions of the head so that the preload modules are interlocked under pressure with the fixing block to be in contact with the head on the mounting plate. The fixing structure may fix the fixing block interlocked with the preload module to the mounting plate to minimize an assembly error between the preload module and the fixing block.

Additionally, the handling module may further include a pressing module that is installed in the mounting plate at a third position of the other one of both longitudinal directions of the head and is configured to depress the head inward or release the head from the inward depression through a forward or reverse rotation. The pressing module may be provided with a lower structure installed on the mounting plate, and an upper structure that is installed on the lower structure to be movable up and down and is tapered generally from top to bottom. The upper structure may glide downwardly inside the lower structure through forward or reverse rotation, causing the outer peripheral surface of the lower structure to depress the outside of the head.

Further, the preload module may be provided with a body facing outward, and a pressing body that is installed on the body and is configured to apply a fixing force to the head with an elastic resilience.

According to the printing apparatus and the method of providing the same of the present disclosure as described above, one or more of the following effects are provided.

The present disclosure can provide a printing apparatus assembled in an effective way to reduce clearances between different components thereof to achieve narrow tolerance for error.

Additionally, the present disclosure can provide a printing apparatus capable of improving the printing quality by increasing the ink injection accuracy of the printing apparatus with narrow tolerance for error through the reduction of the clearances in the printing apparatus.

Further, the present disclosure can provide a printing apparatus capable of improving the printing quality by increasing the ink injection accuracy of the printing apparatus through the measurement of the flatness of such component portions of the printing apparatus that are responsible for mounting the heads of the printing apparatus and through effective correction of the flatness.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which:

FIG. 1 is a perspective view of the components of a printing apparatus according to at least one embodiment of the present disclosure.

FIG. 2 is a perspective view of some components of the printing apparatus of FIG. 1.

FIGS. 3 to 5 are views of some components of the printing apparatus according to at least one embodiment of the present disclosure.

FIG. 6 is an exploded perspective view of some components in FIG. 1.

FIGS. 7 to 10 are views illustrating in detail some components in FIG. 1.

FIGS. 11 to 18 are views illustrating the components in FIG. 1.

FIG. 19 is a flowchart of a method of providing a printing apparatus according to another embodiment of the present disclosure.

REFERENCE NUMERALS

| | |
|---|---|
| 100: printing apparatus | 110: base panel/head base |
| 120: head pack | 121: head |
| 122: head pack base | 123: piping module |
| 130: head pack holder | 131: first fastening body |
| 132: bridge portion | 133: second fastening body |
| 141: datum pin | 142: cut pin |
| 141, 142: fastening structure | 150: first theta-axis rotating unit |
| 155: first manual stage unit | 160: linear motion guide unit |
| 170: second theta-axis rotating unit | 175: second manual stage unit |
| 180: third manual stage unit | 185: mounting pin |
| 190: compensating ring | 212: preload module |
| 213: fixing structure | 214: pressing module |
| 1221: mounting plate | 1221a: fixing block |
| 1222: first elongated body | 1223: second elongated body |
| 1224: first flange | 1225: second flange |
| 2121: body | 2122: pressing body |
| 2141: lower structure | 2142: upper structure |
| A: enlarged portion | G2: groove |
| M1, M2: first, second marking | L1, L2: first, second fastener |
| P: link pin | R1, R2: first, second contact ring |
| TH1, TH2: first, second insertion groove | |

DETAILED DESCRIPTION OF THE EMBODIMENTS

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like reference numerals refer to like elements throughout the specification.

Spatially relative terms, such as “below,” “beneath,” “lower,” “above,” “upper,” and the like, may be used herein for ease of description to convey one object’s or feature’s relationship to another object(s) or feature(s) as illustrated in the drawings. It will be understood that the spatially relative terms are intended to encompass different orientations of the object in use or operation in addition to the orientation depicted in the drawings. For example, when objects in the drawings are turned over, objects described as “below” or “beneath” other objects or features would then be oriented “above” the other objects or features. Thus, the illustrative term “below” can encompass both an orientation of above and below. The object may be otherwise oriented (rotated 90 degrees or at other orientations), and the spatially relative descriptors used herein may be interpreted accordingly.

It will be understood that, although the terms first, second, etc. may be used herein to describe various objects, components, and/or sections, these objects, components, and/or sections should not be limited by these terms. These terms are only used to distinguish one object, component, or section from another object, component, or section. Thus, a first object, first component, or first section discussed below could be termed a second object, second component, or second section without departing from the teachings of the present disclosure.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, objects and/or components, but do not preclude the presence or addition of one or more other features, integers, steps, operations, objects, components and/or groups thereof. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, some embodiments of the present disclosure will be described in detail with reference to the accompanying drawings. In the following description, like reference numerals designate like elements, although the elements are shown in different drawings. Further, in the following description of some embodiments, a detailed description of related known components and functions when considered to obscure the subject of the present disclosure will be omitted for the purpose of clarity and for brevity.

Referring to FIGS. 1 to 3, a printing apparatus 100 according to at least one embodiment of the present disclosure includes a base panel or head base 110, at least one or more head packs 120, a head pack holder 130, a fastening structure 141 & 142, a first theta-axis rotating unit 150 (FIG. 6), a first manual stage unit 155, a linear motion guide unit 160, a second theta-axis rotating unit 170, a second manual stage unit 175, and a third manual stage unit 180.

Here, the fastening structure 141 & 142 includes a datum pin 141 and a cut pin 142. The head pack 120 includes a plurality of heads 121, a head pack base 122 (FIG. 4), and a piping module 123.

Referring to FIGS. 2 and 3, the head pack base 122 includes a mounting plate 1221, a first elongated body 1222, a second elongated body 1223, a first flange 1224, and a second flange 1225. The head pack holder 130 includes a first fastening body 131, a bridge portion 132, and a second fastening body 133.

The head packs 120 are installed in a single head base 110. Here, the head base includes a panel-shaped type formed with a hollow region of a predetermined dimension. The head pack holder 130 is installed on the head pack 120 for handling and fixing the head pack 120.

Referring to FIG. 4, to dispatch a chemical solution, the pipe module 123 of the head pack 120 is installed on at least some of the plurality of heads 121 and the head pack base 122 in which the heads 121 are installed.

The mounting plate 1221 of the head pack base 122 is where the heads 121 are installed. The first elongated body 1222 of the head pack base 122 is a portion extending upward from one side of the mounting plate 1221.

Here, the second elongated body 1223 of the head pack base 122 is a portion extending upward from the other side of the mounting plate 1221 to face the first elongated body 1222.

The first flange 1224 of the head pack base 122 extends outwardly from the first elongated body 1222. The second flange 1225 of the head pack base 122 extends outwardly from the second elongated body 1223. Meanwhile, the head pack holder 130 is installed by way of the first flange 1224 and the second flange 1225.

The first fastening body 131 of the head pack holder 130 is provided in the form of a panel on one side. The second fastening body 133 of the head pack holder 130 is provided to face the first fastening body 131 via the bridge portion 132. Here, the first fastening body 131 is installed on the bottom of the first flange 1224, and the second fastening body 133 is installed on the bottom of the second flange 1225.

Referring to FIG. 6, the first theta-axis rotating unit 150 is installed under the first fastening body 131 and performs a theta-axis rotational operation. The first manual stage unit 155 in the form of a block is installed under the first theta-axis rotating unit 150 and transfers its rotating operation in the theta-axis direction to attachments to the first manual stage unit 155.

The linear motion guide unit 160 is installed under the first manual stage unit 155 and provides a moving force in the Y-axis direction in response to the theta-axis rotation operation. The second theta-axis rotating unit 170 is installed under the second fastening body 133 and performs a theta-axis rotation operation.

The second manual stage unit 175 is installed under the second theta-axis rotating unit 170 and is provided in the form of a block that transfers its rotating operation in the theta-axis direction to attachments to the second manual stage unit 175. Additionally, the third manual stage unit 180 is installed under the second manual stage unit 175 and provides a moving force in the theta-axis direction through a manipulation means or device.

Referring to FIGS. 3 to 10, the first flange 1224 is provided with a first fastener L1 for fixing the datum pin 141 having a variable position in a first insertion groove TH1 of the first flange 1224 within a predetermined range. (FIG. 3).

The second flange 1225 is provided with a second fastener L2 for fixing the cut pin 142 whose position is variable in a predetermined range in a second insertion groove TH2 formed in the second flange 1225. The first fastener L1 is fixedly inserted from above the first flange 1224 into the datum pin 141 of the first fastening body 131. (FIG. 3)

Meanwhile, a first contact ring R1 is provided between the first fastener L1 and the first flange 1224 to reinforce the joining strength therebetween. (FIG. 3)

The second fastener L2 is fixedly inserted from above the second flange 1225 into the cut pin 142 of the second fastening body 133. (FIG. 8)

At this time, a second contact ring R2 is provided between the second fastener L2 and the second flange 1225 to reinforce the joining strength therebetween. The second contact ring R2 has a through hole H2 formed from top to bottom thereof, and a groove G2 is formed on a side surface of the cut pin 142 in the height direction. (FIG. 3)

The second contact ring R2 is aligned at a predetermined position corresponding to the cut pin 142 by using a link pin P that enters the groove G2 of the cut pin through the through hole H2 of the second contact ring R2. (FIGS. 7 and 8)

The second fastener L2 is installed in a position aligned with the second flange 1225 and the second fastening body 133 through the second contact ring R2. The head pack holder 130 is provided with a correction structure for correcting the flatness of the understructure of each head 121 on the head pack 120. (FIGS. 3 and 7 to 9)

The correction structure is provided with mounting pins 185 and compensating rings 190. The mounting pins 185 are mounted respectively on the head pack holder 130 at the set positions for the first fastening body 131 and the second fastening body 133. (FIG. 10)

The compensating rings 190 are positioned at the set positions and are inserted over the mounting pins 185, respectively. The compensating rings 190 are compressively fixed to the first fastening body 131 and the second fastening body 133 of the head pack holder 130 based on the forward or reverse rotation of the mounting pins 185. The compensating ring 190 has a compensating thickness corresponding to a correction value needed for correcting the flatness of the understructure of the heads 121. (FIG. 10)

Here, the identifiable states include a first identifiable state and a second identifiable state. The first identifiable state is established by providing the head pack holder 130 with a first marking position indicated by a first marking M1 for allowing mounting of the datum pin 141 to the head pack holder 130, and providing the head pack holder 130 with a second marking position indicated by a second marking M2 which is different from the first marking M1, for allowing mounting of the cut pin 142 to the head pack holder 130. (FIGS. 1 and 8)

The second identification state allows distinctive mountings of the datum pin 141 and the cut pin 142 to the head pack holder 130 and is established by providing the head pack holder 130 with only one of the first marking M1 and the second marking M2. (FIGS. 1 and 8)

Additionally, the fastening structure 141 & 142 is for mounting the head pack holder 130 to the head pack 120. More specifically, the datum pin 141 of the fastening structure 141 & 142 is adapted to fasten the head pack holder 130 to the head pack 120. (FIG. 3)

The cut pin 142 of the fastening structure 141 & 142 is provided in the head pack holder 130. The cut pin 142 of the fastening structure 141 & 142 is adapted to fasten the head pack holder 130 to the head pack 120 after the datum pin 141 fastens the head pack holder 130. (FIG. 3)

The datum pin 141 and the cut pin 142 are fastened with a torque ranging from 120 to 130 kgf·cm through a torque wrench. This is carried out manually or automatically by a machine. (FIG. 3)

The datum pin 141 and the cut pin 142 are respectively fastened to the head pack holder 130 based on identifiable states that are mutually distinguishable. The identifiable states are established is to prevent mutually confused fastening between the datum pin 141 and the cut pin 142to prevent deterioration of operating performance on the printing device. (FIG. 3)

The datum pin 141 is installed on top of the first fastening body 131 and is inserted into the first insertion groove TH1 of the first flange 1224. The cut pin 142 is installed on top of the second fastening body 133 and is inserted into the second insertion groove TH2 of the first flange 1224. (FIG. 3)

The datum pin 141 and the cut pin 142 are formed to taper upward. The first insertion groove TH1 and the second insertion groove TH2 are made to conform to the datum pin 141 and the cut pin 141, respectively. (FIG. 3)

Referring to FIGS. 11 to 18, the mounting plate 1221 has a bottom portion provided with a handling module for fixing an understructure of the heads 121. The handling module is provided with a fixing block 1221*a* mounted on the bottom portion of the mounting plate 1221, a fixing structure 213 configured to fix the fixing block 1221*a* to the mounting plate 1221, and at least one or more preload modules 212 each placed in the mounting plate 1221 and configured to preload the side of the head 121 in a forward rotation or reverse rotation method. (FIGS. 11 and 12)

Here, the preload modules 212 are respectively installed in the mounting plate 1221 at a first position in any one of the vertical directions of the head 121 and a second position in any one of both longitudinal directions of the head 121. (FIGS. 11 and 12)

The preload modules 212 are installed so that the preload modules 212 are pressurized by and interlocked with the fixing block 1221*a* to be in contact with the head 121 on the mounting plate 1221. The fixing structure 213 is adapted to fix the fixing block 1221*a* interlocked with the preload module 212 to the mounting plate 1221 to minimize an assembly error between the preload module 212 and the fixing block 1221*a*. (FIGS. 11 and 12)

Additionally, the handling module further includes a pressing module 214 that is installed in the mounting plate 1221 at a third position of the other one of both longitudinal directions of the head 121 and is configured to depress the head 121 inward or release the head 121 from the inward depression through a forward or reverse rotation. (FIGS. 11, 12 to 14, and 16)

The pressing module 214 is provided with a lower structure 2141 installed on the mounting plate 1221, and an upper structure 2142 that is installed on the lower structure 2141 to be movable up and down and is tapered generally from top to bottom. (FIGS. 11, 12 to 14, and 16)

Here, the upper structure 2142 glides downwardly inside the lower structure 2141 through forward or reverse rotation, causing the outer peripheral surface of the lower structure 2141 to depress the outside of the head 121. (FIGS. 12 to 14)

The preload module 212 is provided with a body 2121 facing outward, and a pressing body 2122 installed on the body 2121 and is adapted to apply a fixing force to the head 121 with an elastic resilience. (FIG. 15)

Referring to FIG. 19 based on the foregoing, a method of providing a printing device (Step S100) according to at least one embodiment of the present disclosure includes Step S110 to Step S140. First, the head pack 120 is at least partially assembled in S110. In Step S120, the head pack 120 is installed on a panel-shaped head base.

Step S130 measures the flatness of the head pack 120 at its bottom surface configured to discharge the chemical solution, and Step S140 corrects the flatness of the head pack 120 based on the measured flatness of the bottom surface of the head pack 120.

While a few exemplary embodiments of the present disclosure have been described with reference to the accompanying drawings, those skilled in the art will readily appreciate that various changes in form and details may be made therein without departing from the technical idea and scope of the present disclosure as defined by the following claims. Therefore, it is to be understood that the foregoing is illustrative of the present disclosure in all respects and is not to be construed as limited to the specific exemplary embodiments disclosed.

The invention claimed is:

1. A printing apparatus, comprising:
- a base panel or head base;
- at least one or more head packs installed on the head base;
- a head pack holder installed on each of the head packs and configured to handle and fix the head pack, the head pack holder comprising a first fastening body on one side and a second fastening body provided on an other side to face the first fastening body;
- a fastening structure configured to mount the head pack holder to the head packs;

a first theta-axis rotating unit installed under the first fastening body and configured to perform a rotational operation in a theta axis direction;

a first manual stage unit of a block type installed under the first theta-axis rotating unit and configured to transfer the rotational operation in the theta axis direction; and at least one or more linear motion guide units installed under the first manual stage unit and configured to provide a moving force in one direction.

2. The printing apparatus of claim 1, wherein the fastening structure comprises:

a datum pin provided in the head pack holder and configured to fasten the head pack holder to the head pack; and a cut pin provided in the head pack holder and configured to fasten the head pack holder to the head pack after the datum pin fastens the head pack holder.

3. The printing apparatus of claim 2, wherein the datum pin and the cut pin are fastened with a torque ranging from 120 to 130 kgf cm through a torque wrench.

4. The printing apparatus of claim 2, wherein the datum pin and the cut pin are respectively fastened to the head pack holder based on identifiable states that are mutually distinguishable.

5. The printing apparatus of claim 4, wherein the identifiable states comprise:

a first identifiable state established by providing the head pack holder with a first marking position indicated by a first marking for allowing mounting of the datum pin to the head pack holder, and providing the head pack holder with a second marking position indicated by a second marking, which is different from the first marking, for allowing mounting of the cut pin to the head pack holder; and a second identifiable state configured to allow distinctive mountings of the datum pin and the cut pin to the head pack holder and established by providing the head pack holder with only one of the first marking and the second marking.

6. The printing apparatus of claim 5, wherein the identifiable states each comprise:

a second identifiable state configured to allow distinctive mountings of the datum pin and the cut pin to the head pack holder and established by providing the head pack holder with only one of the first marking and the second marking.

7. The printing apparatus of claim 1, wherein the head pack comprises:

a plurality of heads;

a head pack base on which the heads are installed; and a piping module installed on the heads and the head pack base and configured to dispatch a chemical solution.

8. The printing apparatus of claim 7, wherein the head pack base comprises:

a mounting plate for the heads to be installed;

a first elongated body extending upwardly of one side of the mounting plate;

a second elongated body extending upwardly of an other side of the mounting plate;

a first flange extending outwardly of the first elongated body; and a second flange extending outwardly of the second elongated body, and wherein the head pack holder is installed via the first flange and the second flange.

9. The printing apparatus of claim 8, wherein the second fastening body is provided on the other side to face the first fastening body through a bridge portion, and wherein the first fastening body is installed on a lower surface of the first flange, and the second fastening body is installed on a lower surface of the second flange.

10. A printing apparatus, comprising:

a base panel or head base;

at least one or more head packs installed on the head base;

a head pack holder installed on each of the head packs and configured to handle and fix the head pack; and a fastening structure configured to mount the head pack holder to the head packs, wherein the fastening structure comprises:

a datum pin provided in the head pack holder and configured to fasten the head pack holder to the head pack, and a cut pin provided in the head pack holder and configured to fasten the head pack holder to the head pack, wherein the datum pin and the cut pin are respectively fastened to the head pack holder, wherein the head pack holder comprises:

a first marking indicating a first marking position for allowing mounting of the datum pin to the head pack holder, and providing a second marking indicating a second marking position for allowing mounting of the cut pin to the head pack holder, wherein the second marking is different from the first marking to be mutually distinguishable from each other, wherein the head pack comprises a plurality of heads, a head pack base on which the heads are installed, and a piping module installed on the heads and the head pack base and configured to dispatch a chemical solution, wherein the head pack base comprises a mounting plate for the heads to be installed, a first elongated body extending upwardly of one side of the mounting plate, a second elongated body extending upwardly of an other side of the mounting plate, a first flange extending outwardly of the first elongated body, and a second flange extending outwardly of the second elongated body, wherein the head pack holder comprises a first fastening body on one side and a second fastening body provided on an other side to face the first fastening body through a bridge portion, wherein the first fastening body is installed on a lower surface of the first flange, and the second fastening body is installed on a lower surface of the second flange, wherein the head pack holder is installed via the first flange and the second flange, and the printing apparatus further comprises:

a first theta-axis rotating unit installed under the first fastening body and configured to perform a rotational operation in a theta axis direction;

a first manual stage unit of a block type installed under the first theta-axis rotating unit and configured to transfer the rotational operation in the theta axis direction to attachments to the first manual stage unit; and at least one or more linear motion guide units installed under the first manual stage unit and configured to provide a moving force in a Y-axis direction in response to the rotational operation in the theta axis direction.

11. The printing apparatus of claim 10, further comprising:

a second theta-axis rotating unit installed under the second fastening body and configured to perform the rotational operation in the theta axis direction;

a second manual stage unit of a block type installed under the second theta-axis rotating unit and configured to transfer the rotational operation in the theta axis direction to attachments to the second manual stage unit; and a third manual stage unit installed under the second manual stage unit and configured to provide a moving force in the theta axis direction through a manipulation means.

12. The printing apparatus of claim 11, wherein the datum pin is installed on top of the first fastening body and is received in a first insertion groove formed in the first flange, and the cut pin is installed on top of the second fastening body and is received in a second insertion groove formed in the second flange.

13. The printing apparatus of claim 12, wherein the datum pin and the cut pin are formed to taper upward, and the first insertion groove and the second insertion groove are made to conform to the datum pin and the cut pin, respectively.

14. The printing apparatus of claim 13, wherein the first flange is provided with a first fastener for fixing the datum pin to be variable in position within a predetermined range in the first insertion groove, wherein the second flange is provided with a second fastener for fixing the cut pin to be variable in position within a predetermined range in the second insertion groove, wherein the first fastener is inserted from above the first flange into secure engagement with the datum pin on the first fastening body, wherein the first fastener and the first flange are provided with a first contact ring interposed as a coupling reinforcement between the first fastener and the first flange, wherein the second fastener is inserted from above the second flange into secure engagement with the cut pin on the second fastening body, and wherein the second fastener and the second flange are provided with a second contact ring interposed as a coupling reinforcement between the second fastener and the second flange.

15. The printing apparatus of claim 14, wherein the second contact ring is formed with a through hole from top to bottom of the second contact ring, wherein the cut pin is formed with a groove extending in a height direction along a portion of a circumference of the cut pin, wherein the second contact ring is aligned at a predetermined position corresponding to the cut pin by using a link pin that enters the groove of the cut pin through the through hole of the second contact ring, and wherein the second fastener is installed to be in position and alignment with the second flange and the second fastening body through the second contact ring.

16. The printing apparatus of claim 11, wherein the head pack holder has a correction structure configured to correct a flatness of an understructure of the head on the head pack, and wherein the correction structure comprises:

mounting pins mounted respectively on the head pack holder at set positions for the first fastening body and the second fastening body, and compensating rings disposed at the set positions to be inserted over the mounting pins and compressively fixed to the first fastening body and the second fastening body of the head pack holder based on a forward or reverse rotation of the mounting pins.

17. The printing apparatus of claim 16, wherein the compensating rings each have a compensating thickness corresponding to a correction value needed for correcting the flatness of the understructure of the head.

* * * * *